US012091887B2

(12) United States Patent
Pohlmann et al.

(10) Patent No.: US 12,091,887 B2
(45) **Date of Patent: *Sep. 17, 2024**

(54) LOCKING DEVICE FOR MOVABLE FURNITURE PARTS

(71) Applicant: Paul Hettich GmbH & Co. KG, Kirchlengern (DE)

(72) Inventors: Volker Pohlmann, Herford (DE); Peter Diembeck, Bielefeld (DE)

(73) Assignee: Paul Hettich GmbH & Co. KG, Kirchlengern (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/031,683

(22) PCT Filed: Oct. 5, 2021

(86) PCT No.: PCT/EP2021/077359
§ 371 (c)(1),
(2) Date: Apr. 13, 2023

(87) PCT Pub. No.: WO2022/078808
PCT Pub. Date: Apr. 21, 2022

(65) Prior Publication Data

US 2023/0407680 A1 Dec. 21, 2023

(30) Foreign Application Priority Data

Oct. 17, 2020 (DE) ..................... 10 2020 127 403.3

(51) Int. Cl.
*E05B 65/464* (2017.01)

(52) U.S. Cl.
CPC .................................. *E05B 65/464* (2013.01)

(58) Field of Classification Search
CPC .... E05B 65/462; E05B 65/463; E05B 65/464; E05B 65/465; E05B 65/466; A47B 88/50; A47B 2097/008
See application file for complete search history.

(56) References Cited

U.S. PATENT DOCUMENTS 3,866,993 A 2/1975 Dean et al.
4,425,013 A * 1/1984 Killen .................. E05B 65/463 D6/671.1

(Continued)

FOREIGN PATENT DOCUMENTS

DE 24 12 114 A1 4/1975
DE 36 33 256 A1 3/1988

(Continued)

OTHER PUBLICATIONS

International Search Report in PCT/EP2021/077357, mailed Jan. 17, 2022.

(Continued)

*Primary Examiner* — Andrew Roersma
(74) *Attorney, Agent, or Firm* — Collard & Roe, P.C.

(57) ABSTRACT

A locking device for movable furniture parts has a guide rail with displaceable blocking elements, a plurality of latches that can be coupled to a movable furniture part, and, in a locking position, block an opening of the movable furniture part. The blocking elements are movable into a locking position in which all the latches are blocked by the blocking elements from a movement into an unlocking position, and the blocking elements are displaceable along the guide rail in an anti-tipping position via one of the latches, from the locking position into the unlocking position. When one of the latches is positioned in the unlocking position, the movement of all further latches into the unlocking position (Continued)

Figure 1:
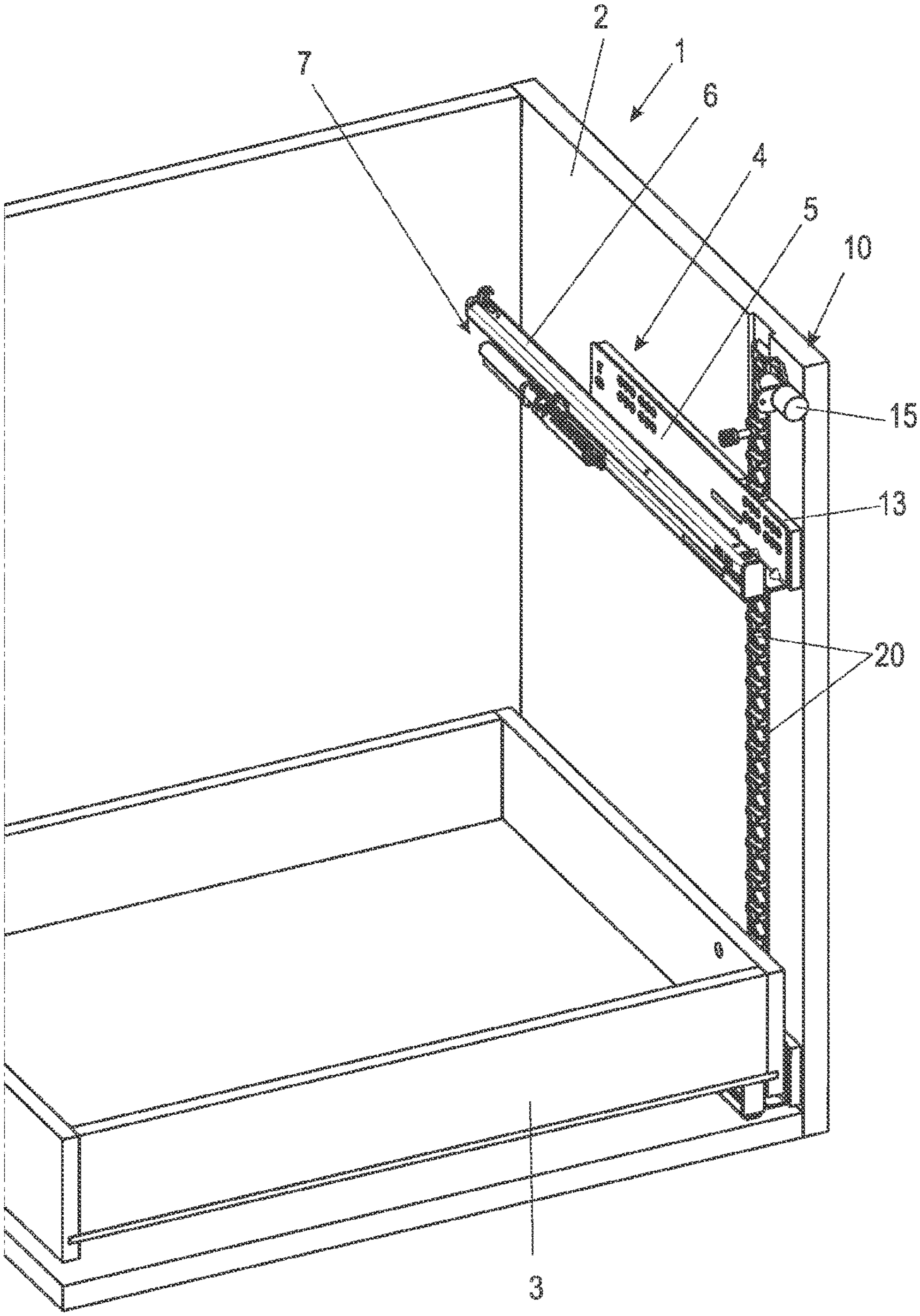

is blocked, so that only one of the movable furniture parts is moveable into an opening position.

11 Claims, 7 Drawing Sheets

(56) References Cited

U.S. PATENT DOCUMENTS

| | | | | |
|---|---|---|---|---|
| 5,931,548 | A | 8/1999 | Bischoff | |
| 8,287,057 | B2 * | 10/2012 | Sevillano Gil | E05B 65/464<br>312/221 |
| 8,899,699 | B2 * | 12/2014 | Fulterer | A47B 88/477<br>312/217 |
| 9,068,378 | B2 | 6/2015 | Milani et al. | |
| 2008/0284294 | A1 * | 11/2008 | Leidner | E05B 65/464<br>312/221 |
| 2010/0123375 | A1 * | 5/2010 | Romaen | E05B 65/462<br>312/215 |
| 2014/0354121 | A1 * | 12/2014 | Frison | E05B 65/464<br>312/221 |
| 2020/0015587 | A1 * | 1/2020 | Zhang | E05B 65/463 |
| 2023/0383576 | A1 * | 11/2023 | Pohlmann | E05B 65/464 |

FOREIGN PATENT DOCUMENTS

| | | | | |
|---|---|---|---|---|
| DE | 4315452 | A1 * | 1/1994 | E05B 65/463 |
| DE | 20301340 | U1 * | 4/2003 | A47B 88/00 |
| DE | 10 2004 050 619 | B3 | 5/2006 | |
| DE | 10 2005 054 006 | B4 | 1/2008 | |
| DE | 20 2009 000 050 | U1 | 6/2010 | |
| DE | 202010008837 | U1 * | 2/2011 | A47B 88/43 |
| DE | 102011000493 | A1 * | 8/2012 | A47B 88/467 |
| DE | 202013009168 | U1 * | 12/2013 | E05B 65/462 |
| DE | 102012109751 | A * | 4/2014 | |
| EP | 2210525 | A2 * | 7/2010 | A47B 88/467 |
| EP | 2 239 402 | A2 | 10/2010 | |
| EP | 2354393 | A1 * | 8/2011 | A47B 88/463 |
| EP | 2 862 993 | A2 | 4/2015 | |
| KR | 20-0359980 | Y1 | 8/2004 | |
| KR | 10-0767096 | B1 | 10/2007 | |
| WO | WO-2011146952 | A1 * | 12/2011 | E05B 65/464 |
| WO | 2018/106167 | A1 | 6/2018 | |

OTHER PUBLICATIONS

German Search Report dated Jun. 30, 2021 in German Application No. 10 2020 127 404.1 with English Translation of relevant parts.

International Search Report in PCT/EP2021/077359, mailed Jan. 19, 2022.

German Search Report dated Jun. 30, 2021 in German Application No. 10 2020 127 403.3 with English Translation of relevant parts.

* cited by examiner

LOCKING DEVICE FOR MOVABLE FURNITURE PARTS

CROSS REFERENCE TO RELATED APPLICATIONS

This application is the National Stage of PCT/EP2021/077359 filed on Oct. 5, 2021, which claims priority under 35 U.S.C. § 119 of German Application No. 10 2020 127 403.3 filed on Oct. 17, 2020, the disclosure of which is incorporated by reference. The international application under PCT article 21(2) was not published in English.

The present invention relates to a locking device for movable furniture parts, comprising a guide rail on which a plurality of blocking elements are displaceably held, a plurality of latches, each of which can be coupled to a movable furniture part and are moveable between a locking position and an unlocking position and, in a locking position, block an opening of the movable furniture part, wherein the blocking elements are moveable into a locking position, in which all the latches are blocked by the blocking elements from moving into the unlocking position, and the blocking elements are displaceable along the guide rail in an anti-tipping position via one of the latches from the locking position into the unlocking position, and when one of the latches is positioned in the unlocking position, the movement of all the other latches into the unlocking position is blocked, so that only one of the movable furniture parts is moveable into an opening position.

EP 2 239 402 A2 discloses a locking arrangement for furniture in which a plurality of locking elements are displaceably held on a locking bar. The locking elements can be used to lock an extendable furniture part so that it is ensured that only one of several extendable furniture parts is moved into the protruding opening position. This provides protection against tipping, for example in the case of roller containers. With this locking arrangement, however, it is disadvantageous that only one push element can be arranged in the opening position, which is particularly disruptive when the furniture is dismantled, for example for moving house.

It is therefore an object of the present invention to create a locking device for movable furniture parts which is flexible and also allows simultaneous unlocking of all movable furniture parts in a simple manner.

This object is achieved with a locking device having the features of claim 1.

The locking device according to the invention comprises several latches, each of which can be coupled to a movable furniture part and are moveable between a locking position and an unlocking position, wherein an opening of the movable furniture part is blocked in a locking position and an opening movement is permitted in an unlocking position. The coupling between the latch and the movable furniture part can be designed, for example, as disclosed in DE 20 2009 000 050 U1. The latch is moved only slightly between the locking position and the unlocking position, for example less than 30 mm, while the movable furniture part is coupled to the latch only for a small distance and is otherwise movable in free running.

Blocking elements are moveable along the guide rail via the latches, whereby the blocking elements in a locking position block all latches against movement into the unlocking position. In an anti-tipping position, only a single latch can be moved from the locking position into the unlocking position in order to then at least partially displace the blocking elements when positioning the latch in the unlocking position, so that all other latches are then blocked from moving into the unlocking position and only a single movable furniture part can be moved into an opening position. The blocking elements are additionally moveable into a release position, i.e. a third position in addition to the locking position and the anti-tipping position, in which all latches are moveable from the locking position into the unlocking position on or in a receptacle of a blocking element. When all latches are moved from the locking position into the unlocking position, all movable furniture parts can be moved independently of each other in the opening direction, for example when dismantling the furniture and removing the movable furniture parts, for example drawers, for a move. This increases the flexibility of the locking device and the comfort for the user.

Preferably, the locking device comprises at least one switching mechanism, such as a lock, by means of which the blocking elements on the guide rail are moveable between the locking position, the anti-tipping position and the release position. The user therefore only has to move the switching mechanism, for example the lock, into one of the three positions, for example by a rotary movement, in order to effect a complete locking, a complete opening for all movable furniture parts or an anti-tipping function in which only one movable furniture part is moveable into the opening position at the same time. Via the switching mechanism, for example, the guide rail with a stop for the blocking elements can be moved in a vertical direction so that the blocking elements are moved relative to the latches, in particular in a vertical direction.

In a preferred embodiment, however, it is also possible to use a separate second switching mechanism only to control the release position, for example to prevent unintentional incorrect actuation. This second switching mechanism can be hidden or spaced apart from the first switching mechanism and/or controlled via separate actuating elements. Mechanical or electromechanical locks, rocker switches, latches or locks can be used as switching mechanisms, which can be actuated directly or indirectly, for example via levers, cable pulls or other transmission means, and can be moved into different positions.

Preferably, each latch is designed as a driver that can be moved between the locking position and the unlocking position via a self-closing mechanism. The latch is then only moved a short distance along the blocking elements. When moving between the unlocking position and the locking position, the latch can remain completely within the guide rail in plan view, so that a compact design is ensured.

Each blocking element preferably comprises a run-up slope, and one of the latches is moveable against the run-up slope in the anti-tipping position in order to displace the blocking element and the blocking elements arranged above it upwards along the guide rail. In this way, a displacement of the blocking elements over the run-up slope can be effected with little effort in order to move one latch from the locking position into the unlocking position. In this position, all other latches are then blocked from moving into the unlocking position.

Preferably, each blocking element comprises a wall to block a movement of a latch into the unlocking position in the locking position. This wall thus serves as a stop for the latch, which then in turn blocks the movable furniture part in the closed position.

Each blocking element preferably additionally comprises a receptacle, for example a channel-shaped receptacle, into which the latch is moveable in the unlocking position. In this way, each latch is moveable into the receptacle in the unlocking position on one of the blocking elements and thus enables the movable furniture part to be moved in the opening direction.

For a flat construction of the locking device, the wall and the run-up slope can be designed to protrude from the guide rail. The receptacle with the channel, on the other hand, is arranged between the wall and the run-up slope so that a groove-shaped channel is formed into which the latch can be inserted if required.

The locking device according to the invention is preferably used in a piece of furniture comprising a furniture body with several movable furniture parts in the form of drawers which can be locked to the furniture body via the locking device.

For example, workshop, practice or laboratory furnishings for which the use of movable drawers or drawer elements is intended are also understood as furniture according to the invention.

Figure 2:
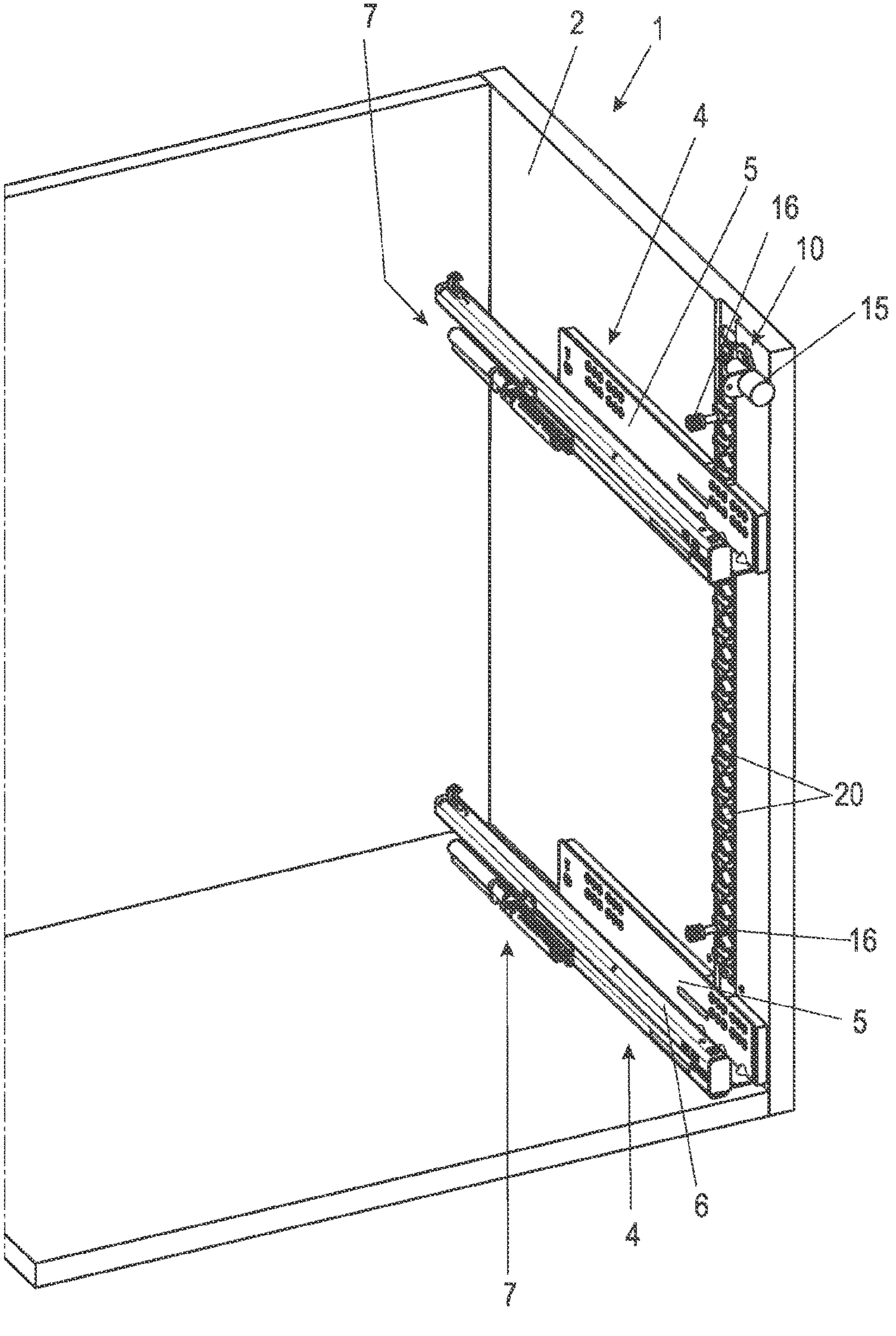
Figure 3:
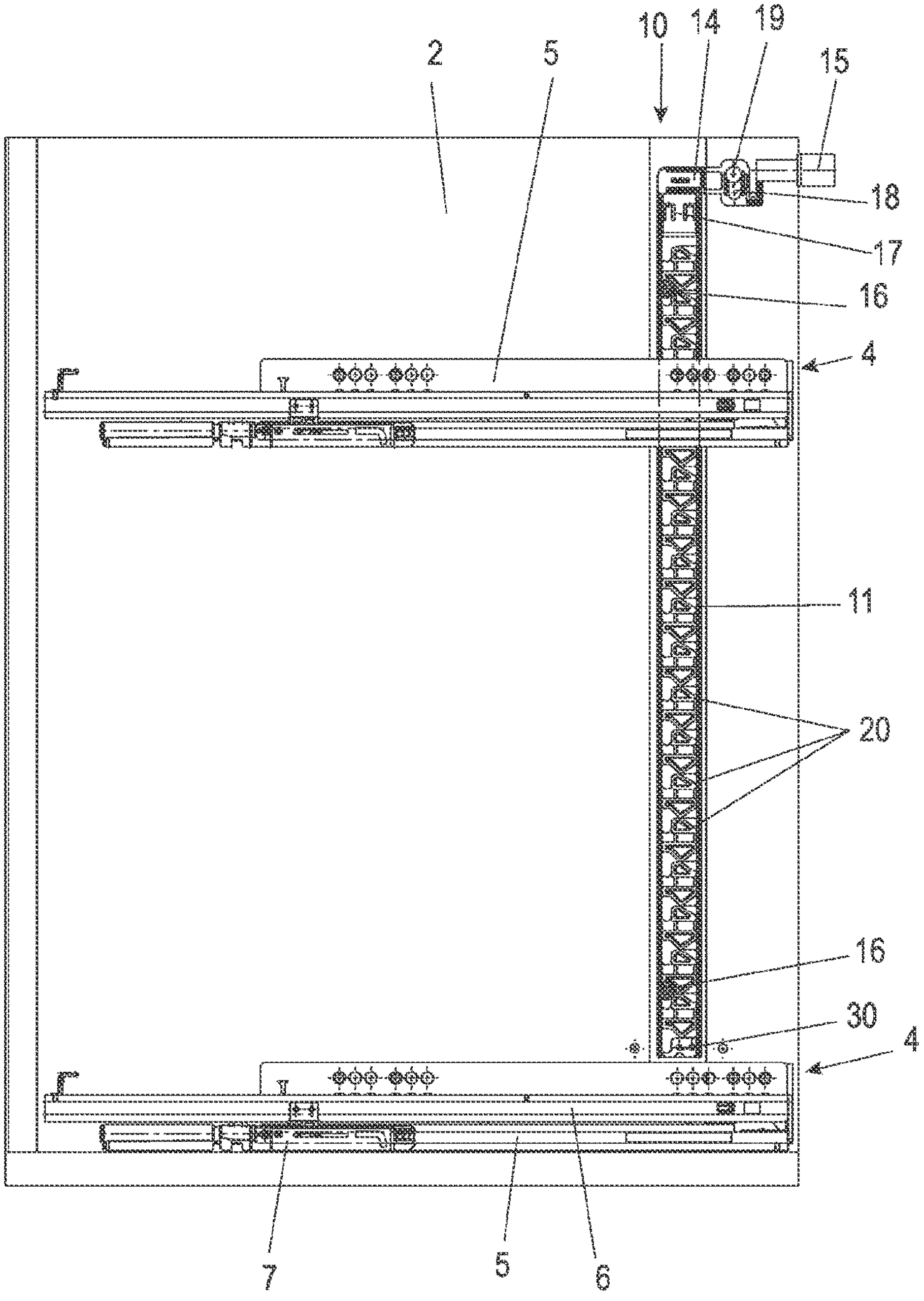
Figure 4:
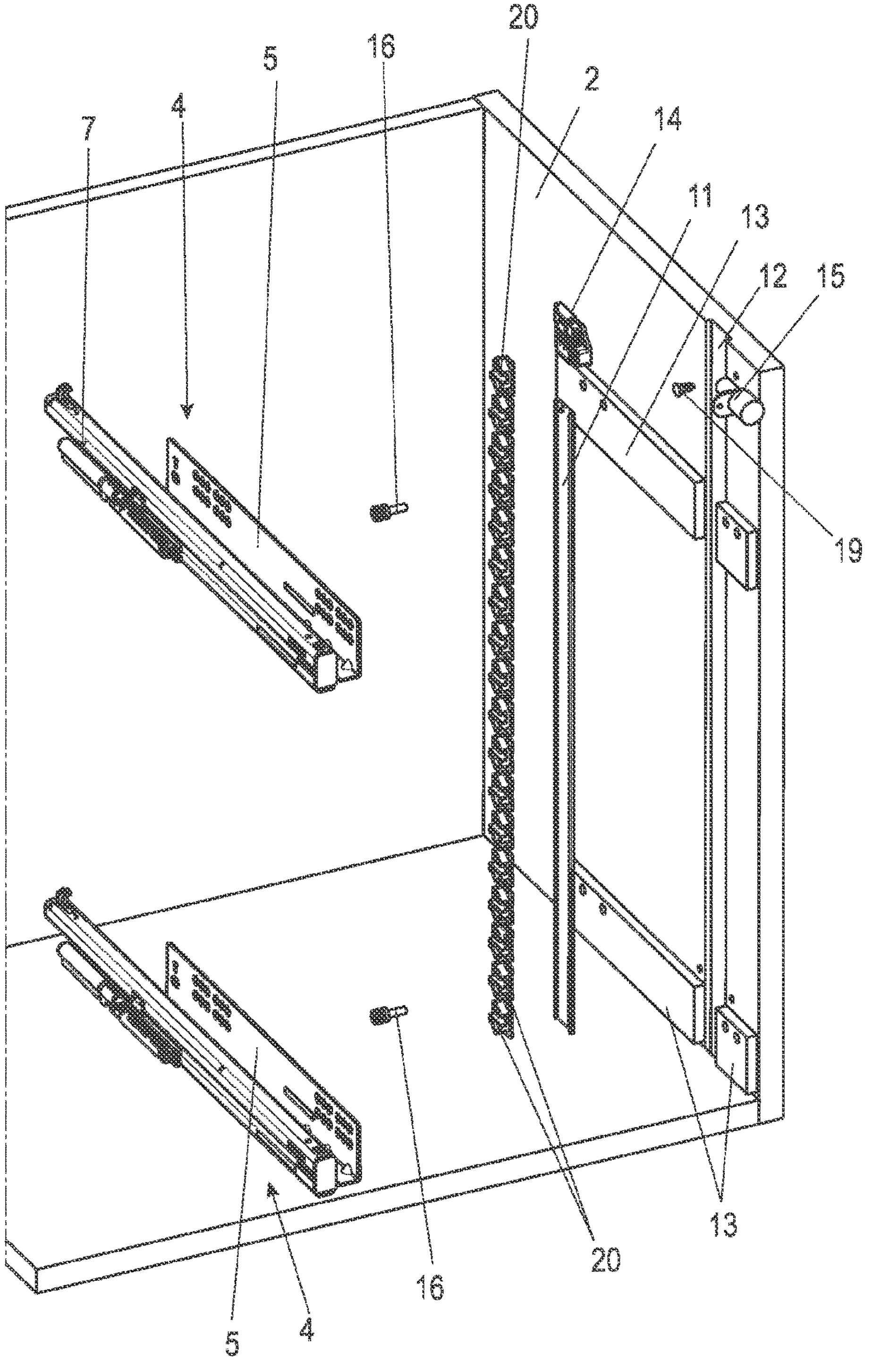
Figures 5A, 5B, 5C, 5D:
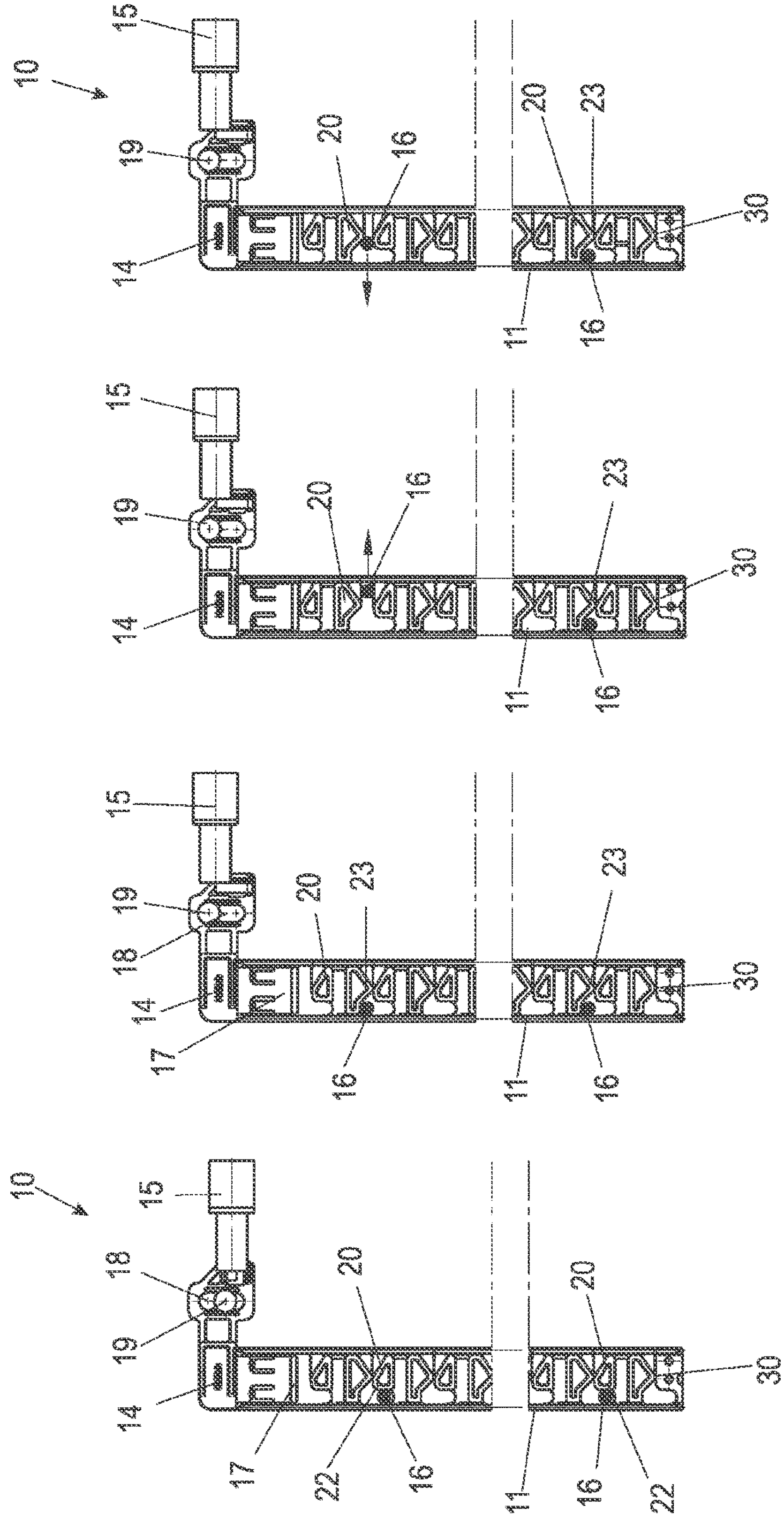
Figure 5G:
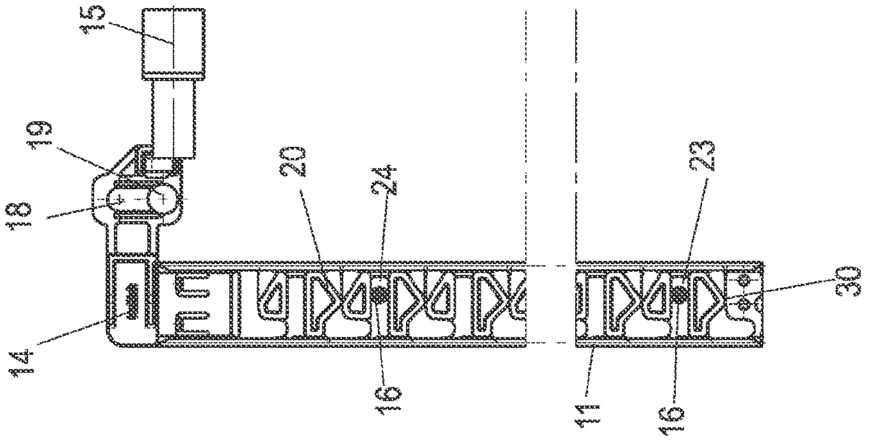
Figure 5F:
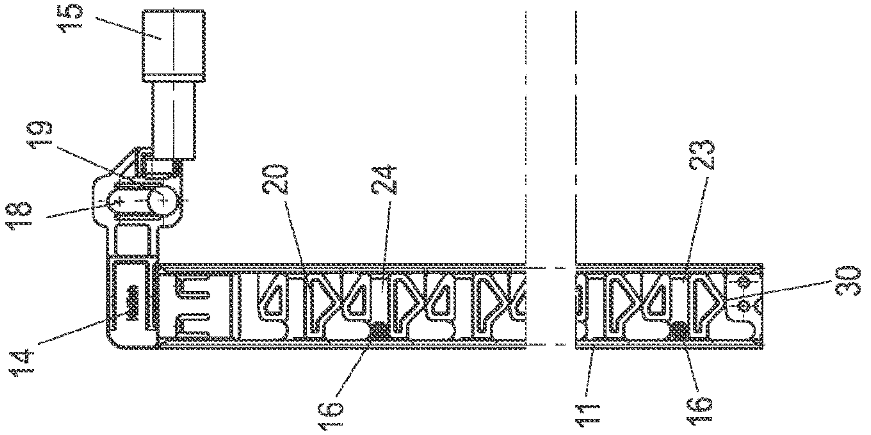
Figure 5E:
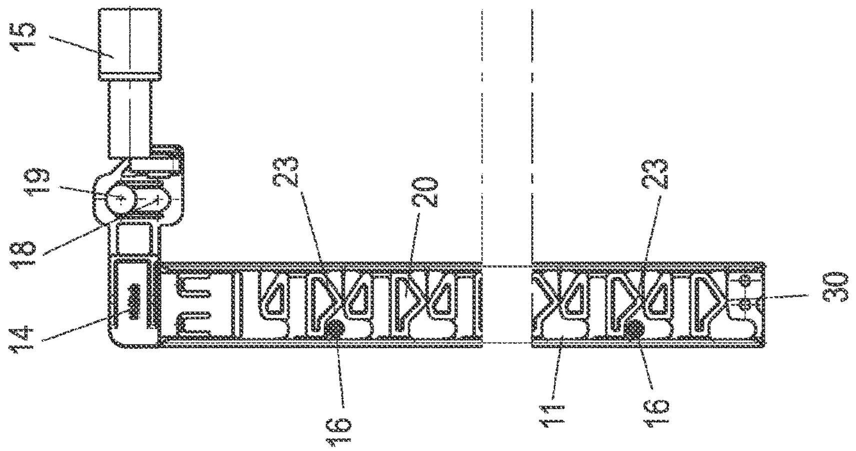
Figure 6A:
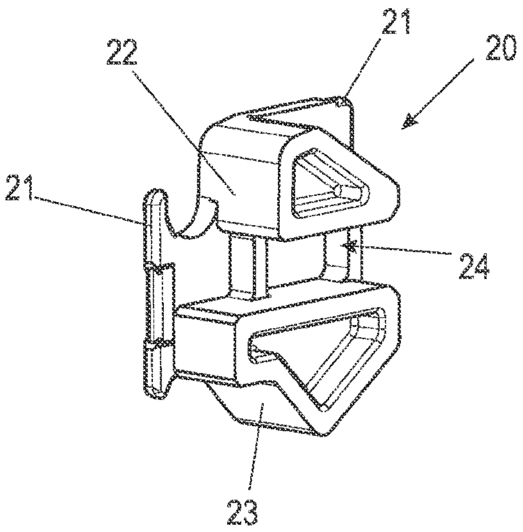
Figure 6B:
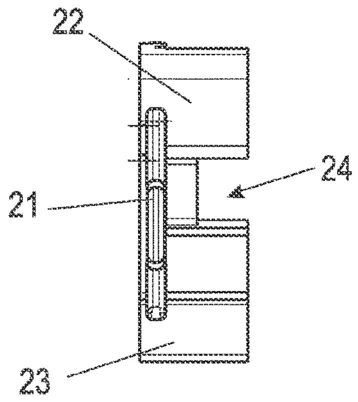

The invention is explained in more detail below by means of an example of an embodiment with reference to the accompanying drawings. It shows:

FIG. 1 A perspective view of a piece of furniture according to the invention with a locking device;

FIG. 2 A view of the furniture of FIG. 1 without the push element;

FIG. 3 A side view of the locking device of FIG. 2;

FIG. 4 An exploded view of the locking device of FIG. 2;

FIGS. 5A to 5G Several detailed views of the locking device in different positions, and FIGS. 6A and 6B Two detailed views of a blocking element of the locking device.

A piece of furniture 1 comprises a furniture body 2 on which pull-out guides 4 are fixed to opposite side walls. Each pull-out guide 4 comprises a stationary rail 5 and a movable rail 6, between which there may optionally be at least one central rail extending the length of the drawer. A self-closing device 7 and/or an ejecting device can be provided on the pull-out guide 4 in order to pull in or eject a movable furniture part 3 in the form of a drawer.

A locking device 10 for movable furniture parts 3 is provided on at least one side wall of the furniture body 2, by means of which it can be controlled whether or not a movable furniture part 3 can be moved into an opening position via the pull-out guide 4.

The locking device 10 comprises a guide rail 11 which is inserted into a groove 12 on the side wall of the furniture body 2 and which can be moved in the vertical direction via a switching mechanism 15. In this embodiment, one switching mechanism 15 is used to set all switching positions of the guide rail 11, optionally the guide rail 11 can also be moved via several switching mechanisms 15.

The guide rail 11 extends over several pull-out guides 4, as shown in FIGS. 2 and 3. Only two pull-out guides 4 are shown, although more than two pull-out guides can also be mounted on a side wall of the furniture body 2.

As shown in FIG. 4, the stationary rails 5 of the pull-out guide are not mounted directly on the side wall, but via the interposition of a spacer 13, in particular a plate. The spacer 13 comprises a recess in the area of a groove 12 for the guide rail 11. A plurality of blocking elements 20 are displaceably held in the guide rail 11, which are made, for example, as moulded bodies of plastic or metal. The blocking elements 20 are movable in the mounted position, and the stationary rail 5 is prevented from blocking the blocking elements 20 via the spacers 13. It is also possible to make the groove 12 deeper and to dispense with the spacers 13 or to guide the guide rail 11 via other guide elements, in particular linear bearings, instead of in a groove 12.

In this embodiment, the switching mechanism 15 comprises a mechanical lock with a rotatable knob by means of which a connecting element 14, which is mounted on a pin 19 in an elongated hole 18, is moveable in the vertical direction. The guide rail 11 can be raised or lowered via the connecting element 14. A stop 30 is provided in the lower area of the guide rail 11 (FIG. 3), which ensures that the blocking elements 20 are moved together with the guide rail 11.

The latches 16 that can be coupled to the movable furniture part 3 are arranged on the blocking elements 20 and can be moved in the horizontal direction between a locking position and an unlocking position. In this case, the latches 16 are only moved over a short distance, for example less than 30 mm, and are only coupled to the movable furniture part over this distance at the beginning of the pull-out movement. The coupling can, for example, be effected via a self-closing mechanism as disclosed in DE 20 2009 000 050 U1. Other coupling systems via drivers or other mechanisms are also possible.

FIGS. 5A to 5G show the functionality of the locking device in different positions of the latches 16 and the blocking elements 20.

In FIG. 5A, the locking device 10 is in a locking position where all latches 16 are prevented from moving from the locking position on the left side of the guide rail 11 to an unlocking position on the right side of the guide rail 11 by blocking elements 20. This is because, via the switching mechanism 15 and the connecting element 14, the guide rail 11 is raised so that all latches 16 are positioned opposite a wall 22 of the blocking element 20, which blocks movement in the horizontal direction to the right in FIG. 5A.

If the switching mechanism 15 is moved into an anti-tipping position, for example by turning a knob through 90°, the connecting element 14 is lowered. As shown in the anti-tipping position in FIG. 5B, all latches 16 are no longer located opposite the wall 22 on a blocking element 20, but adjacent to a run-up slope 23 of the blocking element 20 above. Each run-up slope 23 is oriented at an angle to the vertical and horizontal.

If one of the movable furniture parts 3 is now moved in the opening direction, for example the upper furniture part 3, the latch 16 moves from the locking position to the unlocking position on the right-hand side of the guide rail 11 as shown in FIG. 5C. This movement of the latch 16 releases the movable furniture part 3 and it can now be moved in the opening direction. In the process, the associated blocking element 20 has been moved upwards by the movement of the latch 16 against the run-up slope 23, whereby all the blocking elements 20 above it are also moved upwards depending on the position of the latch 16. As a result, the uppermost blocking element 20 lies directly adjacent to a web 17 on the connecting element 14 and cannot be moved further upwards. If a force is now applied to the lower latch 16 by the movable furniture part 3 in order to be moved from the locking position to the unlocking position, the latch 16 presses against the run-up slope 23 and attempts to further raise the blocking elements 20 arranged above it. However, this movement is blocked by the upper latch 16 which is located in the unlocked position between two adjacent blocking elements 20, so that it is ensured that only one movable furniture part 3 can move out of the furniture body 2 at the same time, resulting in effective protection against tipping.

FIG. 5D shows the position in which the upper latch 16 is moved from the unlocked position back to the locked position, as shown by the arrow. The blocking element 20 now contacts the latch 16 again via the run-up slope 23 and can be moved downwards along the guide rail 11 due to gravity. It is also possible to arrange a force accumulator on the web 17 to support this movement, which presses the blocking element 20 back into the initial position. When the latch 16 is arranged in the locking position, another movable furniture part 3 and thus the latch 16 coupled to it can now be moved into the unlocking position.

In FIG. 5E the locking device 10 is shown in the anti-tipping position, in which optionally one of the latches 16 can be moved into the unlocking position, in which case the associated blocking element is then moved upwards via the run-up slope 23. If the user wishes to dismantle the movable furniture parts 3 and move them all simultaneously or independently of each other in the opening direction, the connecting element 14 and the guide rail 11 can be raised via the or a further switching mechanism 15, as shown in FIG. 5F. For this purpose, a knob on the switching mechanism 15 can be turned, for example by 90°, so that the connecting element 14 is moved along the pin 19 inside the elongated hole 18 on the connecting element 14. In this raised release position, all latches 16 are in the area of a receptacle 24 on a blocking element 20. The receptacle 24 allows all latches 16 to be moved simultaneously from the locking position on the left side of the guide rail 11 to the release position on the right side of the guide rail 11, as shown in FIG. 5G. Both latches 16 have been moved to the unlocking position and are located within the receptacle 24 on a blocking element 20. The terms "right", "left" and "up", "down" refer only to the illustration in FIGS. 1 to 5 and can be changed as desired depending on the installation situation.

FIGS. 6A and 6B show a blocking element 20 in detail, which can be made, for example, as a moulded body from plastic or metal and can be constructed in one or more pieces. Each blocking element 20 comprises guide webs 21, which are embraced by an edge on the guide rail 11, so that the blocking element 20 is held in a linearly displaceable manner along the guide rail 11. The blocking element 20 comprises a plate-shaped section which is arranged in the guide rail 11. A projection with the wall 22 protrudes from this plate-shaped section, which in a locking position blocks all latches 16 against movement into the unlocking position.

Further, the blocking element 20 comprises a run-up slope 23 formed at a lower end and projecting from the guide rail 11 so that the latch 16 can move the blocking element 20 upwardly along the guide rail 11 when moving from the locking position to the unlocking position.

Between the wall 22 and the stop slope 23 there is a receptacle 24 in the form of a channel which is groove-shaped and allows the latch 16 to be accommodated. If the latches 16 are arranged at the height of the receptacle 24, all latches 16 can be moved simultaneously from the locking position to the unlocking position.

In the embodiment example shown, only two movable furniture parts 3 are provided as push elements, each of which moves a latch 16. It is of course possible to use the locking device for more than two movable furniture parts 3.

The locking device 10 can be moved into three positions via a single switching mechanism 15, namely the anti-tipping position, the locking position and the release position. It is also possible to provide the release position via a separate lever or actuating element so that only the locking position and the anti-tipping position are adjustable via the switching mechanism 15.

LIST OF REFERENCE SIGNS

1 Furniture
2 Furniture body
3 Movable furniture part
4 Pull-out guide
5 Stationary rail
6 Movable rail
7 Self-closing device
10 Blocking device
11 Guide rail
12 Groove
13 Spacer
14 Connecting element
15 Switching mechanism
16 Latch
17 Web
18 Elongated hole
19 Pin
20 Locking element
21 Guide web
22 Wall
23 Run-up slope
24 Receptable
30 Stop

The invention claimed is:

1. A locking device (10) for movable furniture parts (3), comprising:

a) a guide rail (11) on which a plurality of blocking elements (20) are displaceably held;

b) a plurality of latches (16), each of which are configured to be coupled to a movable furniture part (3) movable between a locking position and an unlocking position and, in a locking position, configured to block an opening of the movable furniture part (3) when the locking device is coupled to the movable furniture part;

c) wherein the blocking elements (20) are movable into a blocking position in which all said latches (16) are blocked by the blocking elements (20) from moving into the unlocking position;

d) wherein the blocking elements (20) are displaceable along the guide rail (11) in an anti-tipping position via one of the latches (16) moving from the locking position into the unlocking position, and when the one of the latches (16) is moved to the unlocking position, the movement of all further said latches (16) into the unlocking position is blocked so that when the locking device is coupled to the movable furniture parts, only one of the movable furniture parts (3) is moveable into an opening position, and wherein the blocking elements (20) are movable into a release position in which all the latches (16) are movable from the locking position into the unlocking position on or into a receptacle of a respective one of the blocking elements (20).

2. The locking device according to claim 1, wherein the locking device (10) comprises at least one switching mechanism (15) by means of which the blocking elements (20) on the guide rail (11) are moveable between the locking position, an anti-tipping position and the release position.

3. The locking device according to claim 1, wherein the locking device (10) comprises a first switching mechanism (15) by means of which the blocking elements (20) on the guide rail (11) are movable between the locking position and an anti-tipping position and a second switching mechanism (15) by means of which the blocking elements (20) on the guide rail (11) are movable between the anti-tipping position and the release position.

4. The locking device according to claim 2, wherein the guide rail (11) includes a stop (30) for the blocking elements (20) is moveable in the vertical direction via the switching mechanism (15).

5. The locking device according to claim 1, wherein each said latch (16) is formed as a driver which is moveable between the locking position and the unlocking position via a self-closing device (7).

6. The locking device according to claim 1, wherein each said blocking element (20) comprises a run-up slope (23) and, in an anti-tipping position, one of the latches (16) is movable against the run-up slope (23) in order to displace the blocking element (20) and the blocking elements (20) arranged above it said blocking element upwards along the guide rail (11).

7. The locking device according to claim 1, wherein each said blocking element (20) comprises a wall (22) for blocking, in the blocking position, a movement of one of the latches (16) towards the unlocking position.

8. The locking device according to claim 1, wherein the receptacle of each said blocking element (20) is formed as a channel and the latches (16) are moveable along the channels into the unlocking position.

9. The locking device according to claim 5, wherein the wall (22) and the run-up slope (23) are formed protruding from the guide rail (11).

10. The locking device according to claim 5, wherein the receptacle (24) for the latch (16) is arranged between the wall (22) and the run-up slope (23) on the blocking element (20).

11. Furniture (1) with a furniture body (2), a locking device according to claim 1, and several movable furniture parts (3) in the form of drawers which are each lockable via the locking device (10).

* * * * *